United States Patent
Cox et al.

(10) Patent No.: US 8,698,820 B2
(45) Date of Patent: Apr. 15, 2014

(54) GRAPHICS PROCESSING SYSTEMS

(75) Inventors: Andrew Helge Cox, London (GB); Robert Elliot, Cambridge (GB); Robin Fell, St. Ives (GB); Sean Ellis, Surrey (GB)

(73) Assignee: ARM Limited, Cambridge (GB)

( * ) Notice: Subject to any disclaimer, the term of this patent is extended or adjusted under 35 U.S.C. 154(b) by 757 days.

(21) Appl. No.: 12/457,300

(22) Filed: Jun. 5, 2009

(65) Prior Publication Data

US 2010/0007662 A1    Jan. 14, 2010

(30) Foreign Application Priority Data

Jun. 5, 2008   (GB) .................................. 0810311.1

(51) Int. Cl.
*G06T 15/00*   (2011.01)

(52) U.S. Cl.
USPC .......................................... 345/522; 345/422

(58) Field of Classification Search
USPC .......................................... 345/422, 421, 522
See application file for complete search history.

(56) References Cited

U.S. PATENT DOCUMENTS

| | | | |
|---|---|---|---|
| 5,325,485 A | 6/1994 | Hochmuth et al. | |
| 5,734,806 A | 3/1998 | Narayanaswami | |
| 5,949,423 A * | 9/1999 | Olsen | 345/422 |
| 6,646,639 B1 * | 11/2003 | Greene et al. | 345/422 |
| 6,801,215 B1 * | 10/2004 | Silva et al. | 345/629 |
| 6,894,689 B1 * | 5/2005 | Greene et al. | 345/422 |
| 7,158,132 B1 * | 1/2007 | Moffitt et al. | 345/421 |
| 7,170,513 B1 * | 1/2007 | Voorhies et al. | 345/421 |
| 2004/0075654 A1 | 4/2004 | Hsiao et al. | |
| 2006/0203011 A1 | 9/2006 | Kobayashi | |
| 2008/0278509 A1 | 11/2008 | Washizu et al. | |

FOREIGN PATENT DOCUMENTS

| | | |
|---|---|---|
| EP | 0 606 685 | 7/1994 |
| EP | 1 306 811 | 5/2003 |
| JP | 02 255991 | 10/1990 |
| JP | A 08-055239 | 2/1996 |
| JP | A 2008-123520 | 5/2008 |

OTHER PUBLICATIONS

UK Search Report dated Nov. 7, 2008 for GB 0810311.1.
T. Aila et al, "Delay Streams for Graphics Hardware" 2003.
UK Search Report dated Oct. 8, 2009 for GB 0909771.8.
Chinese First Office Action issued Sep. 24, 2012 in CN 200910140682.5 and English translation.
Chinese Second Office Action issued Jul. 3, 2013 in CN 200910140682.5 and English translation.
English translation of Japanese Official Action dated Aug. 20, 2013 in Japanese Application No. 2009-135405, 4pgs.

* cited by examiner

*Primary Examiner* — Maurice L McDowell, Jr.
(74) *Attorney, Agent, or Firm* — Nixon & Vanderhye P.C.

(57) ABSTRACT

In a graphics processing system, a command list reader first reads-in and identifies a portion of a command list. The primitives corresponding to the commands in the portion of the command list are then subjected to a Z-only processing pass. This allows a Z-buffer 16 and a hierarchical Z-pyramid 8 to be filled with the appropriate Z-values for the primitives in the portion of the primitive list. The primitives are then subjected to a second, normal rendering, processing pass, but the filled Z-buffer 16 and Z-pyramid from the first processing pass are used together with the Z-tests 7, 10 performed in the second processing pass to determine which primitive should be processed for each sampling point in the second processing pass.

18 Claims, 5 Drawing Sheets

GRAPHICS PROCESSING SYSTEMS

The present invention relates to the processing of computer graphics, and in particular to the processing of 3-dimensional (3D) graphics, e.g., for display on a display screen.

As is known in the art, 3D graphics processing is normally carried out by first dividing a scene to be displayed into a number of similar basic components (so-called "primitives") to allow the 3D graphics processing operations to be more easily carried out. These "primitives" are usually in the form of simple polygons, such as triangles.

The primitives for a scene to be displayed are usually generated by the applications program interface for the graphics processing system, using the graphics drawing instructions (requests) received from the application (e.g. game) that requires the display of the graphics.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) for display.

Once primitives for a scene and their vertices have been generated and defined, they can be processed by the graphics processing system, in order, e.g., to display the scene.

This process basically involves determining which sampling points of an array of sampling points covering the scene area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the scene to be displayed). This is typically done using the positions of the vertices of a primitive.

The rendering process then derives the data, such as red, green and blue (RGB) colour values and an "Alpha" (transparency) value, necessary to display the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

These processes are typically carried out by "representing" the sampling points as discrete graphical entities usually referred to as "fragments" on which the graphics processing operations (such as rendering) are carried out. Each such fragment will correspond to a given sampling point or set of sampling points and, in effect, represent and be used to render a primitive at the sampling point or points in question (the sampling point(s) which the fragment is being used to render).

A "fragment" is therefore effectively (has associated with it) a set of primitive data as interpolated to a given screen space sample point (or points) of a primitive. It may also include per-primitive and other state data that is required to shade the primitive at the sample point(s) (fragment position) in question. Each graphics fragment can reasonably be thought of as being effectively equivalent to a "pixel" of the scene as it is processed.

Indeed, each graphics "fragment" may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

In one known technique for graphics processing, which is commonly referred to as "immediate mode" graphics processing or rendering, primitives are processed (rasterised and rendered) as they are generated, one after another.

In this type of system, the primitives (their vertices) are passed to the graphics system on a first-come, first-served basis, and primitives are thus rendered in the order that they are received.

It is also known in graphics processing systems to use so-called "tile-based" or "deferred" rendering. In tile-based rendering, rather than the entire scene effectively being processed in one go as in immediate mode rendering, the scene to be displayed is divided into a plurality of smaller sub-regions, usually referred to as "tiles". Each tile (sub-region) is rendered separately (typically one-after-another), and the rendered tiles (sub-regions) are then recombined to provide the complete scene for display. In such arrangements, the scene is typically divided into regularly-sized and shaped sub-regions (tiles) (which are usually, e.g., squares or rectangles), but this is not essential.

In both immediate mode and tile-based rendering, the input to the rasterisation and rendering processes will typically include a list of graphics commands to be executed by the graphics processor. This "command list" will include, as is known in the art, commands instructing the graphics processor to draw primitives, and commands instructing other graphics processes, such as rendering state changes, start and end tile commands (in a tile-based system), etc.

In immediate mode rendering this command list will simply list the commands to be executed one-after-another, whereas in tile-based rendering the list may be, and typically will be, divided into "tiles" (i.e. will list the commands for each tile separately to the commands for the other tiles).

One drawback of current graphics processing systems is that because primitives are processed sequentially, and typically not in perfect front-to-back order, a given sampling point (and hence fragment and pixel) may be shaded multiple-times as a scene is processed for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each scene being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as scenes to be rendered become larger and more complex (as there will be more surfaces in the potentially-visible view), and as the use of programmable fragment shading increases (as the cost of shading a given fragment using programmable fragment shading is relatively greater).

The problem of "overdraw" could be significantly reduced by sending primitives for rendering in front-to-back order. However, other graphics processing requirements, such as the need for coherent access to resources such as textures, and the need to minimise the number of API calls per frame, generally mandate other preferred ordering requirements for primitives. Also, a full front-to-back sort of primitives prior to rendering may not be practical while still maintaining a sufficient throughput of primitives to the graphics processing unit. These and other factors mean that front-to-back ordering of primitives for a frame is generally not possible or desirable in practice.

A number of other techniques have therefore been proposed to try to reduce the amount of "overdraw" that is performed when processing a scene for display (i.e. to avoid rendering non-visible primitives and/or fragments, etc.).

For example, it is known to carry out forms of hidden surface removal before a primitive (or fragment) is sent for rendering, to see if the primitive (or fragment, etc.) will be obscured by a primitive (or fragment) that has already been rendered (in which case the new fragment and/or primitive need not be rendered). Such hidden surface removal may comprise, for example, early occlusion culling and/or early-Z (depth) testing processes, as is known in the art.

However, these "early" (prior to rendering) hidden surface removal techniques can only take account of primitives that have already been rendered at the time the new primitive or fragment (the primitive or fragment being "early" tested) is to be processed. This is because the relevant test data (such as the Z-buffer) will only contain data for primitives that have already been processed. Thus these tests cannot, for example, avoid "overdraw", where a primitive is in fact occluded by a later primitive in the rendering order.

It is also known for application (e.g. game) developers to configure the application such that each scene is, in effect, rendered twice, first of all to draw all the opaque scene geometry with all rendering states other than the Z-test and Z-write disabled, and then a second time with full render states enabled.

This has the effect that the first rendering pass effectively fills the Z-buffer with the Z (depth) value of the closest opaque primitive for each fragment (sample) position. In the second, full rendering pass, as the Z-buffer is now filled with the Z-value of the closest opaque primitive, any early-Z test on the second pass can more effectively reject occluded fragments, and in particular will take account of all the primitives rendered in the first, "Z-only" rendering pass, not just of primitives that have been rendered ahead of the fragment in question.

This technique therefore can provide a more efficient early-Z test process, but it has the disadvantage that a given scene must be generated by the application and processed by the graphics processing system twice, once for the Z-only pass, and then again for the "full" rendering pass. While this may not be too problematic for higher powered, e.g. desktop, graphics systems, other, lower powered graphics systems, such as for portable and mobile devices, may, e.g., have bandwidth constraints that make generating and rendering each entire potentially-visible scene twice undesirable.

In another proposal, described in "Delay Streams for Graphics Hardware", by Timo Alia, Ville Miettinen and Petri Nordlund, Siggraph 2003, a graphics processing pipeline is modified to include a delay stream and a second early occlusion test stage. The second early occlusion test takes place before rasterising and rendering, but after a first early occlusion test stage and the delay stream.

The idea here is that by the time a given primitive or fragment reaches the second early occlusion test stage, more fragments will have contributed to the, e.g., Z-buffer data (since the deliberate delay stream allows time for more fragments to complete their processing before a primitive or fragment reaches the second early occlusion test stage), such that that second occlusion test stage can take account of more primitives than in standard, single early occlusion testing arrangements.

However, this arrangement does require some modifications to the graphics processing pipeline, such as the addition of a second early-occlusion test stage and a delay stream.

The Applicants believe therefore that there remains scope for improvements to try to reduce the problem of "overdraw" in graphics processing systems.

According to a first aspect of the present invention, there is provided a method of operating a graphics processor in which lists of graphics commands to be executed by the graphics processor, which lists include commands instructing the graphics processor to draw primitives, are prepared and stored in memory prior to the commands being executed by the graphics processor, the method comprising:

the graphics processor:

performing a first processing pass over a sequence of commands in a portion of a stored command list, to derive data that can aid the selection, from the primitives to be drawn in response to the commands in the portion of the command list, of a primitive or primitives for processing in respect of each sampling point of a set of sampling points;

storing the derived data for aiding the selection of a primitive to be processed at each sampling point; and performing a second processing pass over the sequence of commands, to process the primitives to be drawn in response to the commands in the portion of the stored command list, using the stored data to help select from the sequence of primitives to be drawn in response to the commands in the portion of the stored command list the primitive or primitives to be processed for each sampling point in the second processing pass.

According to a second aspect of the present invention there is provided a graphics processing system in which lists of graphics commands to be executed by the graphics processing system, which lists include commands instructing the graphics processing system to draw primitives, are prepared and stored in memory prior to the commands being executed by the graphics processing system, the graphics processing system comprising:

means for performing a first processing pass over a sequence of commands in a portion of a stored command list, to derive data that can aid the selection, from the primitives to be drawn in response to the commands in the portion of the command list, of a primitive or primitives for processing in respect of each sampling point of a set of sampling points;

means for storing the derived data for aiding the selection of a primitive to be processed at each sampling point; and means for performing a second processing pass over the sequence of commands, to process the primitives to be drawn in response to the commands in the portion of the stored command list, using the stored data to help select from the sequence of primitives to be drawn in response to the commands in the portion of the stored command list the primitive to be processed for each sampling point in the second processing pass.

The present invention provides a graphics processing system and method in which a sequence of commands in a portion of a stored graphics command list (i.e. a set of graphics commands) is processed once to determine information to help select which primitive is to be processed (e.g., and preferably, as will be discussed further below, to determine which primitive is visible) at each sampling point of a set of sampling points, and then processed a second time but using the determined primitive information to help identify which primitive should be processed (e.g. rendered) for a given sampling point during the second processing pass.

In other words, like in the application-driven two stage rendering process described above, the present invention uses a first processing pass to help determine the primitive of a set of primitives (the set of primitives that the portion of the command list corresponds to) that is to be rendered for a given (and each) sampling point (e.g., and preferably, to determine the visibility of the primitives), and then carries out a second processing pass that makes use of the determined primitive processing (e.g. visibility) information.

The present invention accordingly provides a system in which, inter alia, the second processing (rendering) pass of the primitives corresponding to the portion of the command list can be carried out using more precise and/or detailed information about the primitives to be processed at respective sampling points, thereby allowing, for example, more efficient culling of primitives and fragments from the rendering process for the second pass, and thereby reducing or even eliminating, the amount of overdraw that takes place in the second processing pass, thereby leading to the advantages and reducing the problems discussed above for that pass. In particular, the present invention can, for example, allow the second processing pass to account for primitives being occluded by fragments that are generated from primitives that will be reached later in the rendering order (and thus, e.g., avoid rendering non-visible primitives for a sampling point).

Moreover, the present invention provides an advantageous arrangement over the two stage application-driven arrangement described above, in particular in the context of graphics processors for use in lower power and/or constrained systems such as may in particular be used in mobile and portable devices.

In particular, because the present invention uses the stored command list for each of its two processing "passes", it avoids the need to completely generate the scene again a second time, as happens in the application-level approach (since in the application level approach a fresh set of primitive commands, etc., albeit to generate the same set of primitives, is sent to the graphics processor for the second rendering pass).

This can provide, for example, significant memory bandwidth and processing savings in the present invention, for example because the geometry for the primitives does not need to be processed (e.g. transformed and clipped) twice, and, in a tile-based system, the geometry does not need to be sorted into tiles twice. Similarly, the application scene data structures do not need to be retrieved twice.

The present invention can also require no particular actions or steps by the application (e.g. game) developer. As it uses the same command list and data structures for both processing passes, any modifications necessary to implement the present invention can be performed in the graphics processing system itself, thereby avoiding the need for any changes to the host system and application operation.

The present invention is also advantageous over the delay stream and second early-occlusion test arrangement discussed above, since the present invention does not, for example, require the architecture modifications to existing graphics processing pipelines that this "delay stream" arrangement requires.

Indeed, a key advantage of the present invention is that it can be used in and for existing and known graphics processing architectures and in particular can simply reuse existing and known pipeline components and functions to achieve its advantages. This is because, inter alia, the present invention effectively operates by passing a given (portion of a) command list through the graphics pipeline twice, instead of issuing a second set of commands to, in effect, generate the primitives all over again (as in the application level approach), and instead of modifying the pipeline so that a single rendering pass can use more visibility information (as in the "delay streams" approach).

The first processing pass to derive or determine the data for aiding the selection of which of the primitives to be drawn in response to the commands in the portion of a stored command list is to be processed for each sampling point in the second processing pass of the present invention can be carried out in any desired and suitable fashion, for example depending on the criteria to be used to determine whether a primitive is to be processed at a sampling point or not.

Preferably the first processing pass determines for each sampling point of the set of sampling points, data which can be used to aid the selection of a primitive or primitives to be processed for the respective sampling point.

(It should be noted here that references herein to a "first" processing pass are intended to distinguish that pass simply as being the first processing pass of the processing passes of the present invention, and do not, for example, require that pass to be the first of all the processing passes over the command list (or otherwise) that may be performed (although that could be the case). Similar comments apply in relation to references to the "second" processing pass. It would also be possible for other processing passes to take place between the first and second processing passes of the present invention (although that is not preferred).

Similarly, references to performing a processing pass over the commands in the command list portion are intended to refer to processing that involves the execution of some or all of those commands by the graphics processing system, not to the performance of some form of processing of the command list per se, such as writing to the list—in the processing passes of the present invention, the command list is read and its commands executed (as appropriate): the command list is not itself written to.)

In a particularly preferred embodiment, the first processing pass derives or determines data that can aid the identification of which primitive(s) of the primitives to be drawn in response to the commands in the portion of the command list will be visible at the sampling point in question. This is particularly useful as it allows, for example, the second pass through the primitives corresponding to the command list portion to, if desired, only process (e.g., and preferably, render) the visible primitives, thereby, e.g., avoiding rendering (processing) in the second processing pass primitives that will not in fact be visible at a given sampling point.

Thus, in a particularly preferred embodiment, the step of or means for deriving data for aiding the selection of a or the primitive of the primitives corresponding to the portion of the command list to be processed at each sampling point, comprises deriving or determining data that can aid the identification of which primitive or primitives of the primitives corresponding to (to be drawn in response to) the portion of the command list is or could be visible at each sampling point (and then storing that data).

The visibility "test" for the primitives in these arrangements can be carried out as desired, but in a preferred embodiment comprises performing depth (Z)-tests at each sample position so as to determine the visible (e.g., and preferably, the closest, depending on the defined visibility test) primitive at each sample position based on the primitives' Z (depth) values, as is known in the art.

Thus, in a particularly preferred embodiment, the first processing pass comprises performing a Z-test (a depth test) over the primitives corresponding to the portion of the command list at each sample position, preferably so as to determine data that can be used to identify a or the primitive to be processed at each sample position, based on the primitives' Z (depth) values.

In these arrangements, the depth-test Z-compare function used, e.g. to determine the primitive to be processed, could be < (less than), <= (less or equal to), > (greater than), or >= (greater than or equal to), as desired (and as appropriate for the graphics data to be processed—in practice the test defined for the data (primitives) being processed should be used).

Preferably the primitives are rendered in an appropriate manner (and preferably in the normal fashion for the graphics processing system in question so far as the depth (or other) testing is concerned) in the first processing pass to allow the depth (or other) testing to be performed.

It will similarly be appreciated here that in a particularly preferred embodiment of the present invention, the "primitive selection" data that is derived in the first processing pass of the present invention is derived (at least in part) from (e.g. using data derived from) processing the primitives (and preferably from rendering the primitives) to be drawn in response to the commands in the portion of the command list being processed. Similarly, and as will be discussed further herein, the present invention preferably comprises in the first processing pass rendering (drawing) the primitives to be drawn in response to the commands in the portion of the command list being processed (preferably, as will be discussed further below, in a more limited, e.g. "depth-only", fashion), and then rendering (drawing) the primitives to be drawn in response to the commands in the portion of the command list being processed again in the second processing pass (preferably this time for display (output)).

In one particularly preferred embodiment, only the processing (rendering) necessary to determine the data for aiding the selection of a or the primitive to be processed (e.g. that is or may be visible) at each sampling point is carried out in the first processing pass. This may mean that some commands in the portion of the command list are not in fact executed in the first processing pass.

Thus, in the case of a depth-test based determination, in one particularly preferred embodiment the first processing pass over the command list portion preferably comprises performing a Z-only (depth-only) rendering pass over the primitives to be drawn in response to the commands in the portion of the command list, i.e. a processing pass in which the primitives are rendered, but in which the only render states that are enabled are reads and writes of Z and the Z test.

Limiting the processing performed in the first processing pass through the command list has the advantage that that processing pass can be more efficient and consume less resources, thereby making it, for example, more acceptable to perform in more constrained systems. For example, in the case of a Z-only rendering pass, the Z-buffer can be filled, but other memory accesses can be reduced or minimised and the fragment processor may be left idle.

Thus, in one particularly preferred embodiment, the first processing pass of the command list (of the primitives corresponding to the portion of the stored command list) comprises performing only the processing necessary to determine the data for aiding the selection of a or the primitive to be processed at each sampling point.

Thus, in the case of a depth-test based test, in one preferred embodiment, the first processing pass of the primitives corresponding to the portion of the stored command list comprises performing a Z-only rendering pass on the primitives so as to determine data for aiding the identification of which primitive or primitives of the primitives corresponding to the portion of the stored command list being processed could or should be processed (e.g. will be visible) at each sampling point in the second processing pass.

However, it would also be possible to carry out more than the minimum processing necessary to determine the data relating to the primitive(s) to be processed at each sampling point in the first processing pass through the command list if desired. This may be desirable to, for example, allow other useful data structures to be built during the first processing pass. For example, the first processing pass could also carry out some interpolation operations for the primitives being processed and that data then stored (e.g. buffered) for use in the second processing pass.

The graphics processing system can be configured in any suitable and desired manner to perform the first processing pass. Preferably it is set to an appropriate render state for this purpose (such as a Z-only render state). (As is known in the art, the render state that a graphics processor is set to determines the processing that the processor will perform on graphics primitives that it receives and so can be used to control the processing that is carried out.)

The (render) "state" for this purpose could, e.g., be set by flushing the processor and setting its state to the new (e.g. Z-only) state globally (i.e. for all processing units), as is known in the art, before sending the portion of the command list for the first processing pass.

However, in a preferred embodiment where the graphics processing system has a number of predefined rendering states that can, e.g., be associated with primitives and/or fragments, such as in the techniques described in the Applicant's earlier patent application GB-A-2420261, then preferably one of the available predefined rendering states (such as rendering state index "0" (or another index)) is set to the render state that is to be used for the first processing pass of the present invention (e.g., and preferably, a Z-only rendering state). This would then allow, e.g., primitives (and/or fragments, etc.) to be tagged with the appropriate "first pass" rendering state index, etc., as they are sent for the first processing pass, so that they are processed accordingly, rather than, e.g., having to flush and change globally the state of the entire processing pipeline.

Preferably the arrangement is such that when a first processing pass in the manner of the present invention is triggered for a set of commands, the predefined render state associated with each primitive (e.g. the render state index (or tag, etc.)) to be drawn in response to the set of commands is changed (rewritten) to the predefined "first pass" render state before the primitives are sent for their first pass processing (but changed only for this pass). This would then allow the primitives to automatically pick-up the, e.g., Z-only, first pass render state for that pass, without the need for earlier redefinition of, or changes to, their and/or the processor's render state.

It is similarly preferred where the graphics processing system supports fragment shading programs, for there to be a predefined fragment program address that is reserved for and used for the first pass (e.g. Z-only) processing (render state).

This would again then allow primitives and fragments to be tagged with this predefined fragment program address when undergoing the first pass of the present invention, and accordingly avoid, e.g., the need to apply a global first pass (e.g. Z-only) state to the graphics processor and/or the need to modify intermediate stages of the processor to carry forward information that primitives and/or fragments are undergoing the first pass of the present invention.

The reserved program address in these arrangements should accordingly trigger an appropriate action (e.g. fragment shader program) for the first pass processing.

In a preferred embodiment, it simply causes the fragment shader (stage or unit) to be bypassed (since, for example, in the case of a Z-only render state, for example, no fragment shading program would need to be executed, and so the circuit which initialises the fragment shader can simply bypass it in response to the reserved program address).

The data that is derived in the first processing pass and stored for use to aid the selection of a or the primitive to be processed for each sampling point can take any suitable and desired form. This data may, e.g., depend on the nature of the first processing pass.

It preferably comprises data that provides exact or conservative information for selecting a primitive to be processed for a sampling point in the second processing pass.

The data that is derived in the first processing pass may, and in a preferred embodiment does, allow a single primitive that is to be processed in respect of a or each sampling point to be identified, or it may only at best allow a group of primitives that should be processed in respect of a or each sampling point to be identified. This latter case may still be advantageous, as it may still allow the number of primitives processed for a sampling point in the second processing pass to be reduced.

The data determined in the first processing pass could, e.g., and in a preferred embodiment does, indicate directly a primitive or primitives to be processed for a sampling point in the second processing pass, or it could, for example, be, and in another preferred embodiment is, data that can be used to derive the identity of a primitive or primitives to be processed for a sampling point.

In the latter case, the data may, e.g., and in a preferred embodiment does, comprise data that can be used to exclude or reject primitives from the processing for a given sampling point (such that, as a consequence, only a subset of the primitives at most will be processed for the sampling point in the second processing pass).

Thus in one preferred embodiment, the data for aiding the selection of a primitive or primitives that is derived comprises data that can aid the identification of the primitive or primitives, and preferably of the primitive, that should be processed for a sampling point.

In another preferred embodiment, the data comprises data that can aid the identification of a primitive or primitives that should not be processed for a sampling point, e.g., and preferably, such that those primitives can be identified and culled or rejected from the processing for the sampling point in the second processing pass. Again, this data preferably allows all except a single primitive to be omitted from the processing, but it may only allow some but not all but one of the primitives to be rejected for a given sampling point.

Similarly, in a preferred embodiment, the data that is derived to aid the selection of a primitive or primitives to be processed for a sampling point comprises data that can indicate, or that can be used to derive, the identity of, a or the primitive of the primitives corresponding to the portion of the command list that is to be processed for a (each) sampling point.

In a preferred embodiment, the data that is determined and stored aids the determination of the nearest (or furthest) primitive for a sampling point, and/or indicates directly the nearest (or furthest) primitive at a sampling point.

In one particularly preferred embodiment, the data that is derived in, and stored following, the first processing pass comprises a depth buffer derived from the first processing pass (i.e. the Z-value determined for each sampling point during the first processing pass). These depth buffer values will, as is known in the art, indicate the depth of the closest (or furthest) primitive found at each sampling point and can therefore, e.g., be used, via a depth test, to determine (identify) which primitive(s) should be processed (e.g. will be visible) at each sampling point during the second processing pass. (This is similar to the application-driven two stage process described above, where the first pass is used to "fill" the depth buffer, so that the depth information can then be used to "filter" the primitives for the second processing pass.)

In this case the depth buffer values will not directly indicate the primitive to be processed for each sampling point in the second processing pass, but will provide information for selecting (or identifying) the primitive(s) to be processed, as they can, as will be discussed further below, be used to cull primitives from processing for the sampling points in the second processing pass.

Storing and using the depth buffer data in this fashion may be particularly appropriate and advantageous where the first processing pass is, as discussed above, a Z-only pass over the primitives corresponding to the portion of the command list.

In another preferred embodiment, the data that is derived and stored for aiding the selection or identification of a or the primitive to be processed at each sampling point in the second processing pass comprises an identifier for the primitive to be processed (i.e. an identifier that can be used to identify the primitive to be processed at each sampling during the second processing pass). This may be appropriate where, e.g., the first processing pass does not generate Z-values. It would also allow the primitive identifier rather than a Z-test to be used to identify the primitive to be processed in the second pass (which may, at least in some circumstances, be desirable and/or advantageous).

In this case, the data that is determined and stored will indicate directly the primitive to be processed for a sampling point in the second processing pass.

The storing of such primitive identifiers may be instead of or as well as the filling of the Z-buffer in the first processing pass, as desired. Preferably a Z-buffer is determined and stored as well.

The primitive identifier in this arrangement can be generated as desired. Preferably an incrementing counter is used to allocate an ID to each primitive as they enter the pipeline for the first pass, and the IDs of the relevant primitives identified for the sampling points in the first pass are then written to an appropriate primitive ID store (e.g. buffer), e.g., as the corresponding Z-buffer element is written (where appropriate).

Then, in the second processing pass, the counter is reset and restarted (so that each primitive will pick up the same ID from the counter in the second pass as it did in the first pass), the primitives are allocated IDs from the counter as before, and each fragment can then have its respective primitive ID from the second pass compared to the primitive ID previously stored in the primitive ID buffer (from the first pass) for the sampling point(s) in question, and be shaded and written out (or not) in the second pass accordingly (i.e. depending on whether its ID matches the stored primitive ID for the sampling point(s) in question or not).

In this case, the Z-buffer values from the first processing pass (if present) need not and preferably are not used for the per-sampling point processing (or not) test, since the primitive IDs are used for that purpose. However, the Z-values could still be used for other tests, such as an early hierarchical Z-test, if desired.

The second processing pass that is performed over the commands in the portion of command list that underwent the first processing pass of the present invention can be any suitable and desired such pass. It preferably comprises a "normal" or "full" rendering pass over the primitives to be drawn in response to the commands in the portion of the command list, i.e., a rendering pass to provide the data for those primitives necessary to display the primitives on a display. Thus the second pass, for example, is preferably carried out with full render states enabled.

The second processing pass will use the determined primitive selection (e.g. visibility (or other)) information from the first pass. Again this information can be used in any desired and suitable manner, but it is preferably used to avoid, so far as possible, processing for any given sampling point anything other than the primitive(s) determined to be the primitive(s) to be processed for the sampling point in the first processing pass (as this maximises the efficiency of the second processing pass).

Where, as discussed above, the first processing pass determines and stores an identifier for the primitive to be processed at a given sampling point, then the second processing pass preferably, as discussed above, uses the stored identifiers to determine the appropriate primitive for each sampling point, and then processes (preferably renders) only that primitive at (for) that sampling point.

Where the data determined and stored in the first pass for identifying the primitive to be processed comprises a depth buffer (Z-values), then the second processing pass can, and in a preferred embodiment does, perform appropriate depth tests using the stored depth buffer values to determine the primitive to be processed for each sampling point.

Thus, in one preferred embodiment, the second processing pass uses stored primitive identifiers from the first processing pass to determine the primitive to be processed for a and preferably for each sampling point, and in another preferred embodiment, the second processing pass uses stored depth buffer values from the first processing pass to determine the primitive(s) to be processed for a and preferably for each sampling point.

In a particularly preferred embodiment where a depth test is carried out in the second processing pass, the depth-test (Z-test) that is carried out using the depth buffer values derived in the first processing pass is an early depth test (i.e. a depth test that is carried out in advance of (fragment) rendering). This should then allow the early depth test to, in respect of each sampling point, cull all primitives (fragments) prior to rendering except for the one primitive that should be processed for the sampling point in question (since only that primitive (a fragment from that primitive) (or primitives having the same depth value as that primitive) should pass the early depth test).

The depth test(s) in these arrangements can be carried out as desired, and using, for example, any known and suitable techniques.

However, it should be noted here that where a depth test is used in the second processing pass, then although if that depth test is of the form $<=$ (less than or equal to) or $>=$ (greater than or equal to) (as appropriate), that should result in the correct primitive being processed for a sampling point in the second processing pass, if a depth comparison of the form $<$ (less than) or $>$ (greater than) were used in the second processing pass, that could cause all primitives to fail the depth test in the second pass (since the depth buffer will already contain the depth value of the primitive to be processed for a sampling point).

Thus, in a preferred embodiment, the present invention is configured or arranged to take account of this possibility, namely, to ensure, if necessary, that the desired primitive will pass the depth test (Z-test) in the second pass, given that its depth value will already be present in the depth buffer (from the first pass).

This possibility can be taken account of in a number of ways, if desired. Firstly, it will not arise at all where the test used to determine which primitive is to be processed in the second processing pass comprises a comparison of stored identifiers for the primitives to be processed and the primitives being processed in the second processing pass. In this case, as the primitive to be processed in the second processing pass is determined via an identity comparison between the primitive identity allocated to a primitive (and thus fragment or sampling point) in the second processing pass and the identity stored for a given sampling point (fragment) in the first processing pass, the correct primitive should always "pass" the test in the second processing pass.

It would also be possible, for example, to only carry out the present invention for runs of primitives for which the depth test is already defined as being less than or equal to, or greater than or equal to, so that it can be guaranteed that the present invention will produce the correct result. If primitives are generated as being subject to a less than, or greater than, test, then the present invention could be disabled in respect of those primitives. This arrangement could be implemented, for example, with a software change in the graphics processor driver, thereby allowing the present invention to be used in an existing design with minimal and only local changes to it.

In another, particularly preferred embodiment, the depth test carried out during the second processing pass is set to use a Z-compare function of $<=$ (less than or equal to), or $>=$ (greater than or equal to) (as appropriate). If necessary, the Z-compare function is changed to this for the second processing pass.

Thus, in one preferred embodiment, the depth test for the second pass through the primitives is carried out with a Z-compare function of $<$ (less than) being changed to $<=$ (less than or equal to) and a function of $>$ (greater than) being changed to $>=$ (greater than or equal to).

This change could be automatic and fixed in the graphics processor, or it could, for example, be provided in the graphics processor but left to the application developer and/or platform developer to enable if desired.

In this latter case, the possibility to change the Z-compare function for the second processing pass could be provided, for example, as a configuration option for the graphics processor driver, that would then allow a platform integrator to decide whether to use this approach or not. For example, an application extension that has a flag to enable the replacement of any $<$ test by a $<=$ test and any $>$ test by a $>=$ test could be provided and then called by an application if this feature is to be enabled. This would allow this change for the present invention to be implemented with only a software change in the drivers, if desired.

It would also be possible for an application developer to (re)write their application to use $<=$ and $>=$ functions instead of $<$ and $>$ functions so that the present invention can be used, if desired.

In another preferred embodiment, the Z-values determined and stored in the first pass are, if necessary, offset appropriately (i.e. away from the viewpoint for the < (less than) family of Z-comparisons or toward the viewpoint for the > (greater than) family of Z-comparisons), so as to again ensure that the appropriate primitive will pass the Z-test in the second processing pass. Such offsetting of the Z-values will avoid the need to change the Z-comparison function to <= (or >=) for the second processing pass, but should still again ensure that the same primitive as would be drawn at a sampling point without the present invention will be drawn when using the present invention, and should not affect the result of a tie in the Z-test.

In these arrangements, the offset applied to the Z values determined in the first processing pass is preferably the smallest offset that can be applied to the Z-value with any effect. Thus, in the case of an integer Z-buffer, the Z-values written in the first processing pass are preferably incremented or decremented, as appropriate, by one to offset them. For a floating point Z-buffer, preferably the smallest number that could be added to or subtracted from (as appropriate) the determined Z-value is added to (or subtracted from, respectively) the Z-value before it is written to the Z-buffer, to offset the Z-value. (The smallest value in these cases can, e.g., be, and preferably is, determined from the Z-value's exponent and the constant size of its mantissa.)

As discussed above, the command list that is executed in the present invention is stored in memory (and will accordingly be read therefrom during execution of the present invention).

The memory that the command list is stored in may be any suitable and desired such memory. It will, as is known in the art, typically be, and in a preferred embodiment is, memory external to the graphics processing system, such as host-system memory. However, it would also be possible to store the command list (the command list portion) on-chip, on the graphics processor itself, for example in an on-chip buffer (which buffer may not, e.g., be in the form of DRAM but may be some other form of buffer, such as FIFO).

The graphics command lists that are processed in the manner of the present invention may be any suitable and desired such lists, such as a command list for a scene to be rendered in an immediate mode rendering system, or a command list for a given tile in a tile-based system. In a preferred embodiment the present invention is carried out in respect of the command lists for tiles and preferably for each tile separately, in a tile-based rendering system.

The stored command list may contain any suitable and desired graphics commands, although it should contain at least some commands that will trigger the drawing of a number of primitives, such that the portion of the command list will generate a sequence of primitives for processing. Thus, the command list should include commands that have the effect of injecting a stream of primitives into the graphics processor (processing pipeline).

The commands in the command list to instruct the drawing of primitives may be any suitable and desired such commands. Thus they could, for example, each instruct the drawing of a single primitive, or, for example, instruct the drawing of a sequence of primitives. Equally, the commands could provide more detailed data structures for the primitive(s) to be drawn and/or could, for example, more simply denote addresses where the relevant primitive data is to be found.

In the former case, the commands may be, for example, in the form "draw_single_polygon (polygon data)", with data required to draw the primitive embedded directly in the command operands (which data may, for example, be pre- or post-transformation data (as appropriate depending on the graphics processing system)).

In the latter case, commands of the form "set_attrib_address (attrib [1-16], address)", "set_triangle_index_address (format, address)", and "draw_triangles (first_triangle, triangle_count)", could, for example, be used, with in this case the primitives to be drawn being the triangles formed of groups of three elements in arrays of corner indices set by the "set_triangle_index_address( )" command and instantiated by the "draw_triangles( )" command, as is known in the art.

Thus, the command list may include, for example, commands setting the addresses of primitive data index buffers, such as an integer corner index buffer, interspersed with other commands for causing the primitives to be drawn using the data from the index buffers.

In general, the present invention is applicable however the command lists and the commands to draw primitives are structured.

The portion of a stored command list that is processed in the manner of the present invention can comprise any suitable and desired such portion. It may comprise the entire command list in question, although in a preferred embodiment it is a subset of (i.e. less than all of) a given command list.

In a particularly preferred embodiment, the portion of a command list that is processed in the manner of the present invention comprises a portion of the command list that will cause a run of (consecutive) opaque primitives to be drawn. The present invention is particularly applicable to processing sequences of opaque primitives, as opaque primitives generally are suitable for culling using, for example, depth-testing techniques.

Thus, in a preferred embodiment, the present invention will process a sequence of opaque primitives, by sending the primitives through the graphics processing one after another in the first processing pass, and then send the primitives through the graphics processing again one after another for the second processing pass.

The sampling points for which the data relating to the primitives to be processed is derived can similarly be any desired and suitable such sampling points (and set of sampling points). In a preferred embodiment they comprise sampling points, and preferably the sampling points, that will be used when rasterising the primitives when processing them for display. Thus, in a tile-based rendering system for example, the sampling points (and set of sampling points) preferably comprise the set of sampling points to be used when processing a tile for display.

The operation of a graphics processing system in the manner of the present invention may be triggered in any desired and suitable manner, for example using any appropriate mechanism to trigger such operation.

In one particularly preferred embodiment, the operation in the manner of the present invention is triggered by including appropriate commands in the command list to trigger this operation.

Most preferably a command is inserted at the start of the portion of the command list to be processed in the manner of the present invention (e.g. at the start of the drawing of a run of opaque primitives) that will trigger the first processing pass of the present invention. This command accordingly, e.g., and preferably, sets the graphics processor into the mode for carrying out the first processing pass, such as, and preferably, a Z-only render mode.

Similarly, a command is preferably inserted at the end of the portion of the command list (e.g., and preferably, at the end of a set of commands for drawing a run of opaque primitives), to cause the graphics processing to return to and re-execute the portion of the command list, but this time in a different mode (e.g., and preferably, with normal (or full) rendering states enabled).

This latter ("end") command is preferably a conditional branch command that will trigger a branch back to the beginning of the portion of the command list and a change in processing mode if the graphics processor is currently in the first pass (e.g. Z-only) mode (i.e. has just finished the first processing pass of the present invention), but not otherwise (i.e. the branch condition is whether the current processing mode is the first pass mode or not).

Using a conditional branch command of this fashion facilitates straightforwardly triggering the second processing pass over the portion of the command list after the first processing pass of the present invention, while allowing the processing to continue as normal after the second processing pass.

It would be possible to combine the "start of portion" and "end of portion" commands into a single command, if desired. For example, if an instruction is identified by some number of bits in an opcode field, one opcode could be distinguished by using some spare bits elsewhere in the instruction words. Alternatively, the direction of the branch address, forwards/backwards, or a zero address, could be used to distinguish the command to be executed.

In a preferred embodiment, such commands are included in the command lists by the graphics processor driver identifying the portions of command lists to be processed in the manner of the present invention (e.g. that will draw runs of opaque primitives) and inserting the appropriate commands at the fronts and ends of the appropriate portions of the command list, appropriately.

It would also be possible to trigger and control the operation in the manner of the present invention in other ways.

For example, the graphics processor itself could, for example, in the first (e.g. Z-only) processing pass, identify portions of a command list to be processed in this way (e.g. by considering the rendering state allocated to each primitive to see if it is opaque), and, e.g., store the address in the list of the beginning command of the portion so that the processing can jump back to that address (command) once the first processing pass has been completed. A device or peripheral register could, e.g., enable the first (e.g. Z-only) processing pass as a side effect of a "new tile" command list command.

Additionally or alternatively, commands in the command list could be tagged, e.g. by having a reserved bit per command for this purpose, as being to undergo processing in the manner of the present invention. A sequence of such tagged commands in a command list would then accordingly demarcate a run of commands (a portion of the command list) that is suitable for processing and that is to be processed in the manner of the present invention.

It is believed that the use of branch commands of the form discussed above may be new and advantageous in their own right, and not just in the context of the present invention.

Thus, according to a third aspect of the present invention, there is provided a method of controlling the operation of a graphics processing system, comprising:

including in a command list provided to the graphics processing system a branch command which as well as triggering a branch to another point in the command list will also trigger a change in state of the graphics processing system when the branch is taken.

According to a fourth aspect of the present invention, there is provided a graphics processing system, comprising:

means for, in response to a graphics command in a command list received by the graphics processing system for execution, branching to another point in the command list and changing the state of the graphics processing system.

According to a fifth aspect of the present invention, there is provided a method of controlling the operation of a graphics processing system, comprising:

including in a command list provided to the graphics processing system a conditional branch command for which the condition for taking the branch is the current state of the graphics processing system.

According to a sixth aspect of the present invention, there is provided a graphics processing system, comprising:

means for, in response to a conditional branch command in a command list received by the graphics processing system for execution, branching or not to another point in the command list in dependence on the state of the graphics processing system.

As will be appreciated by those skilled in the art, these aspects and embodiments of the present invention can and preferably do include any one or more or all of the preferred and optional features of the invention described herein, as appropriate.

Thus, for example, the state of the graphics processing system is preferably its rendering state, the state change that is triggered by the branch command is preferably a change to a "full" rendering state, and/or the state that the taking of the branch is conditional on is preferably whether the graphics processing system is in a Z-only state or not. Similarly, the arrangement is preferably such that the branch command is both conditional on the current state of the graphics processing system, and triggers a change in that state if the branch is taken.

It will be appreciated from the above that in a particularly preferred embodiment, the present invention comprises performing a first, "Z-only", processing pass to fill the depth buffer, and then a second processing pass to render the primitives for display, but using an early-Z test and the "filled" depth buffer to cull primitives from the second processing pass.

Thus, according to a seventh aspect of the present invention, there is provided a method of operating a graphics processor in which lists of graphics commands to be executed by the graphics processor, which include commands instructing the graphics processor to draw primitives, are prepared and stored in memory prior to the commands being executed by the graphics processor, the method comprising:

performing a Z-only processing pass on primitives to be drawn in response to commands in a portion of a stored command list so as to fill a depth buffer with appropriate depth values for those primitives; and performing a second processing pass on the primitives to be drawn in response to the commands in the portion of the stored command list to render those primitives for display, using the filled depth buffer and an early Z-test to cull primitives from processing in this processing pass.

According to an eighth aspect of the present invention there is provided a graphics processing system in which lists of graphics commands to be executed by the graphics processing system, which include commands instructing the graphics processing system to draw primitives, are prepared and stored in memory prior to the commands being executed by the graphics processing system, the graphics processing system comprising:

means for performing a Z-only processing pass on primitives to be drawn in response to commands in a portion of a stored command list so as to fill a depth buffer with appropriate depth values for those primitives; and means for performing a second processing pass on the primitives to be drawn in response to the commands in the portion of the stored command list to render those primitives for display, using the filled depth buffer and an early Z-test to cull primitives from processing in this processing pass.

As will be appreciated by those skilled in the art, these aspects of the present invention can and preferably do include any one or more or all of the preferred and optional features of the invention described herein, as appropriate. Thus, for example, the portion of the stored command list that is processed is preferably a portion that causes a run of opaque primitives to be drawn. Similarly, the depth test carried out in the second processing pass is preferably of the form $<=$ or $>=$, or the depth buffer values determined in the first pass are preferably offset before being used in the second pass, as discussed above.

As will be appreciated by those skilled in the art, there may be various changes, modifications and/or additions to the various features of the present invention described above.

For example, the first processing pass could, and in a preferred embodiment does, use hidden surface removal techniques, such as early Z-test(s), hierarchical Z-tests, occlusion culling techniques, etc., to try to eliminate primitives and/or fragments from the processing as early as possible.

Similarly, the second processing pass could, and in a preferred embodiment does, use hidden surface removal techniques, such as hierarchical Z-tests, occlusion culling techniques, etc., to try to eliminate primitives and/or fragments from the processing as early as possible.

It will be appreciated that in the present invention, the portion of the command list to be processed in the manner of the present invention is read from memory by the graphics processor twice, once for the first processing pass and then again for the second processing pass. (In other words, the first processing pass comprises reading the portion of the command list from memory, and the second processing pass comprises reading the portion of the command list from memory again. Similarly, the present invention will involve reading the portion of the command list and carrying out the first processing pass on that portion of the command list, and then reading the portion of the command list again and carrying out the second processing pass on the portion of the command list.)

It would be possible for the portion of the command list to be read from its original location (e.g. external memory) each time, but in a particularly preferred embodiment, some or all of the read data from the command list for the first processing pass can be and preferably is stored on the graphics processor itself (e.g. is buffered on the graphics processor itself) after or as it is read for the first processing pass, so that it is then available in "local" memory on the graphics processor (in on-chip memory) for the second processing pass. This will then avoid having to read that data from the original, e.g., external, memory for the second processing pass.

Thus in one preferred embodiment, the stored commands are read from the same memory for both the first and second processing passes, but in another preferred embodiment, some or all of the commands in the portion of the command list are read from a different memory for the second processing pass. (However, it should be noted that in each of these cases (and, indeed, in the present invention in general), the (stored) commands that are read for the second processing pass are or come from the stored commands used for the first processing pass: there is no new generation of these commands for the second processing pass (in the present invention the sequence of commands is generated once: it is not generated again for the second processing pass).)

If, for example, the available on-chip memory is limited, then the portions of the command list that will be processed in the manner of the present invention could, e.g., always be limited to a size that will fit in the on-chip memory (with, e.g., portions, such as portions instructing runs of opaque primitives, that are larger than this being broken into a number of smaller portions that will fit "on-chip"), or a portion of command list could be stored in "on-chip" memory (and retrieved therefrom for the second pass), with the rest of the data then being retrieved from other (external) memory for the second pass. It would also be possible, e.g., to use both arrangements, with, e.g., portions of the command list being broken into smaller portions if they exceed the capacity of the on-chip memory by more than a threshold amount.

The size of the "on-chip" memory (buffer) provided for this purpose can be selected as desired, e.g., based on a performance versus the cost of the "on-chip" memory trade-off.

Although as discussed above, the present invention in the above aspects requires reading the portion of the command list twice from memory, the Applicants have recognised that it would be possible also to exploit the aims and advantages of the present invention without the need to read the portion of the command list twice. In this case, the system could instead generate and store (buffer) sufficient information from the first processing pass to allow it to perform the second processing pass without the need to read the command list again. This may accordingly be at the expense of having to store more data "on-chip" from the first processing pass and to perform more processing during that pass, but would avoid having to read the portion of the command list again.

Thus, according to a ninth aspect of the present invention, there is provided a method of processing primitives in a graphics processing system, the method comprising:

performing a first processing pass on a sequence of primitives in order to determine for each sampling point of a set of sampling points, a primitive or primitives of the primitives in the sequence of primitives to be processed for the sampling point;

storing data to allow the determined primitive or primitives to be processed at each respective sampling point; and performing a second processing pass using the stored data to process the respective primitive or primitives of the sequence of primitives for each sampling point.

According to a tenth aspect of the present invention there is provided a graphics processing system comprising:

means for performing a first processing pass on a sequence of primitives in order to determine for each sampling point of a set of sampling points, a primitive or primitives of the primitives in the sequence of primitives to be processed for the sampling point;

means for storing data to allow the determined primitive or primitives to be processed at each respective sampling point; and means for performing a second processing pass using the stored data to process the respective primitive or primitives of the sequence of primitives for each sampling point.

As will be appreciated by those skilled in the art, these aspects and embodiments of the invention can and preferably do include any one or more or all of the preferred and optional features of the invention described herein, as appropriate. Thus, for example, the second processing pass is preferably to render the primitives (using the stored data) for display.

In these aspects and embodiments of the invention, the sequence of primitives is preferably provided via the reading of a stored portion of a command list, as discussed above. However, the primitives may also or instead, e.g., be fed to the graphics processor one at a time by a CPU, or streamed in via direct memory access (dma), etc.

Preferably, the first processing pass determines which primitive or primitives of the sequence of primitives is to be processed at each sampling point using graphics depth testing techniques, as discussed above. Preferably it determines (and stores data for) a single primitive at each sampling point.

In one preferred arrangement of these aspects of the invention, the first processing pass comprises running any interpolation operations that are necessary, but not sampling any textures, so as to generate the information per sampling point that is stored following the first processing pass to allow the sampling points to e.g., be rendered in the second pass (and without re-processing the entire sequence of primitives in respect of each sampling point). Then, this data can be used in the second pass to render the sampling points for display.

This arrangement has the advantage of not needing to read a command list in again (as discussed above), but will require more data to be stored "on-chip" following the first pass. It also requires primitive set-up and interpolation to be performed in the first pass (but can still avoid the reading of textures and cost of running fragment programs for occluded fragments (primitives) in the second pass).

In another preferred embodiment of these aspects of the invention, the data that is stored following the first processing pass to allow the second processing pass to be performed comprises a bundle of per-primitive state data, including, for example, corner indices, render state data (e.g. index), etc., which has been found in the first pass to be the primitive state that will write to the sampling point in question. The second processing pass can then run through the stored primitive state data to render the sampling points.

Again this arrangement will require the primitive state data to be stored appropriately, e.g., and preferably, in an on-chip primitive state data tile buffer, but will avoid the need, e.g., for the second processing pass to re-read a command list, interpret the command list, rasterise the primitives and perform Z-buffer reads, writes and comparisons, for example. In this arrangement, it may be necessary also, for example, to identify primitive states that have side effects on following primitives, and in the case of such a command, to flush the "primitive state data buffer".

In a preferred such arrangement, the primitive data that is stored for each sampling point comprises the primitive command that is found to be the command that will write to (be drawn at) the sampling point in question. This may be particularly convenient where the primitive commands contain in themselves all the (state) data necessary to render the primitive in question for display.

The primitives that are processed in the manner of the present invention may be any suitable and desired such primitives. They are preferably in the form of simple polygons, as is known in the art. In a preferred embodiment the primitives are triangles.

In a particularly preferred embodiment, the various functions of the present invention are carried out on a single graphics processing platform that generates and outputs the data that is written to a frame buffer for a display device.

The various functions, elements, etc., of the present invention can be implemented as desired, and, for example, and preferably, comprise and/or are carried out by appropriate functional units, processors, processing logic, circuitry, microprocessor arrangements, etc., that are operable to perform the various steps and functions, etc., of the present invention.

The present invention is applicable to any form or configuration of graphics processor, such as graphics processor having a "pipelined" arrangement. In a preferred embodiment it is applied to a hardware graphics pipeline, preferably a rendering pipeline.

The present invention is applicable to all forms of graphics processing and rendering, such as 2D graphics processing, 3D graphics processing, immediate mode rendering, deferred mode rendering, tile-based rendering, etc., although it is particularly applicable to graphics renderers that use deferred mode rendering and in particular to tile-based renderers.

As will be appreciated from the above, the present invention is particularly applicable to 3D graphics processors and processing devices, and accordingly extends to a graphics processor, a graphics processing platform and/or a graphics processing method for processing 3D graphics including the apparatus of, or that is in accordance with, or that is operated in accordance with, any one or more of the aspects of the invention described herein. Subject to any hardware necessary to carry out the specific functions discussed above, such a 3D graphics processor can otherwise include any one or more or all of the usual functional units, etc., that 3D graphics processors include.

Similarly, in a preferred embodiment, the present invention extends to a graphics processor, a graphics processing platform, and/or a graphics processing method for processing 2D graphics including the apparatus of, or that is in accordance with, or that is operated in accordance with, any one or more of the aspects of the invention described herein. Subject to any hardware necessary to carry out the specific functions discussed above, such a 2D graphics processor can otherwise include any one or more or all of the usual functional units, etc., that 2D graphics processors include.

It will also be appreciated that the present invention can be used to process graphics for any suitable and desired output and output device, such as a suitable display device. Thus it may be used, for example, for graphics processing for display on a display screen, for graphics processing for printing (e.g. in a printer render engine), etc.

As will be appreciated from the above, the present invention will involve the generating of a sequence of graphic commands for drawing primitives, and then performing the two processing passes of the present invention over that generated sequence of graphics commands.

According to another aspect of the present invention, there is provided a method of operating a graphics processor in a graphics processing system in which lists of graphics commands for instructing the graphics processor to draw primitives are generated for execution by the graphics processor, the method comprising:

the graphics processor:

performing a first processing pass over a generated sequence of graphics commands, to derive data that can aid the selection, from the primitives to be drawn in response to the commands in the generated sequence of graphics commands, of a primitive or primitives for processing in respect of each sampling point of a set of sampling points;

storing the derived data for aiding the selection of a primitive to be processed at each sampling point; and performing a second processing pass over the generated sequence of commands, to process the primitives to be drawn in response to the commands in the generated sequence of commands, using the stored data to help select from the sequence of primitives to be drawn in response to the commands in generated sequence of commands the primitive or primitives to be processed for each sampling point in the second processing pass.

According to a further aspect of the present invention there is provided a graphics processor for use in a graphics processing system in which lists of graphics commands for instructing the graphics processor to draw primitives are generated for execution by the graphics processor, the graphics processor comprising:

means for performing a first processing pass over a generated sequence of graphics commands, to derive data that can aid the selection, from the primitives to be drawn in response to the commands in the generated sequence of graphics commands, of a primitive or primitives for processing in respect of each sampling point of a set of sampling points;

means for storing the derived data for aiding the selection of a primitive to be processed at each sampling point; and means for performing a second processing pass over the generated sequence of commands, to process the primitives to be drawn in response to the commands in the generated sequence of commands, using the stored data to help select from the sequence of primitives to be drawn in response to the commands in generated sequence of commands the primitive or primitives to be processed for each sampling point in the second processing pass.

It will be appreciated by those skilled in the art that these aspects and embodiments of the present invention can, and preferably do, include, as appropriate, any one or more or all of the preferred and optional features described herein. Thus, for example, the generated sequence of graphics commands preferably triggers the drawing of a run of opaque primitives.

Indeed, it will be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor system, a programmable FPGA (Field programmable gate array), etc.

The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will be described by way of example, only and with reference to the accompanying drawings, in which:

Like reference numerals are used for like components and elements throughout the Figures, unless otherwise indicated.

FIG. 1 shows the pipeline stages that are relevant to the implementation of the present invention of a first embodiment of an exemplary graphics processing system that can be operated in the manner of the present invention. FIG. 1 shows the pipeline stages after the graphics data (the vertex data) has undergone transformation and lighting operations (the "post-transformation" pipeline stages).

Figure 1:
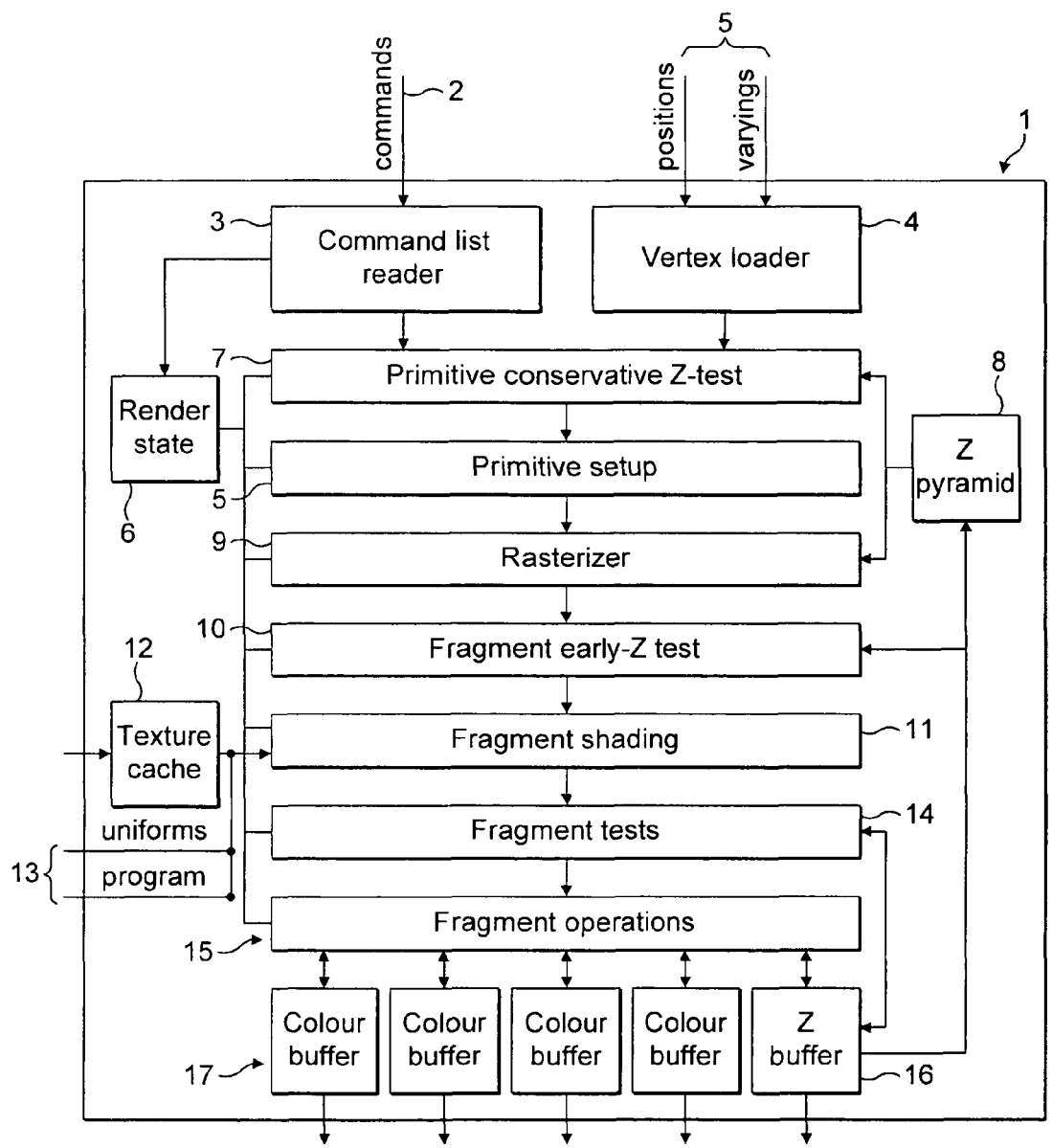
FIG. 1 shows schematically a first embodiment of a graphics processing system in which the present invention can be implemented.

The graphics processing system shown in FIG. 1 is a tile-based system, although the present invention is equally applicable to other systems, such as immediate mode rendering systems, as discussed above.

As shown in FIG. 1, the graphics processing system of this embodiment receives as an input command lists 2. These lists are read from external memory by a command list reader 3 as inputs to the graphics processing system.

The graphics processing system 1 also includes a vertex loader 4 which can read in data 5 relating to vertices of primitives to be processed, such as position and varyings data. Again this data may be retrieved from external memory.

As shown in FIG. 1, the read commands and vertex data are provided to a primitive set-up stage 5, which sets-up the primitives to be rendered in response to the commands and vertex data that it receives, as is known in the art.

The command list reader also provides an input to a render state unit 6 which controls and configures the pipeline to the appropriate rendering state as indicated by the commands read by the command list reader. This render state unit will, accordingly, as shown in FIG. 1, configure stages of the graphics processor 1 to the appropriate state for carrying out the appropriate operations on the primitives that are passed through the pipeline from a primitive set-up stage 5.

In the graphics processing architecture shown in FIG. 1, a primitive conservative Z-test stage 7 precedes the primitive set-up stage 5. As is known in the art, this primitive conservative Z-test stage 7 uses depth value data from a hierarchical Z-buffer, Z-pyramid 8, to attempt to conservatively reject primitives that can be determined to be occluded by primitives that have already been processed (i.e. whose depth values are present in the Z-pyramid 8).

The next stage is for the processing pipeline then to "set-up" the primitives that pass the primitive conservative Z-test in the primitive set-up stage 5.

Those primitives are then rasterised to appropriate sample positions and fragments representing those sample positions generated for rendering. This is performed in a rasterising stage 9.

The rasterised fragments are then submitted to a fragment early Z-test stage 10 which uses values in a Z-buffer 16 to try to cull fragments that can already be determined as being occluded by fragments that have previously been processed, as is known in the art.

Fragments that pass the fragment early Z-test stage 10 are then sent to a fragment shading stage 11 where the fragments are shaded. Such shading may involve, as is known in the art, any suitable and desired fragment shading processes, such as performing fragment shader programs on the fragments, applying textures to the fragments (using, e.g., a texture cache 12), applying blending, fogging or other operations to the fragments, etc., as is known in the art. The fragment shading stage 11 may also use other inputs, such as fragment shader programs and uniforms 13 as shown in FIG. 1.

There is then a fragment test stage 14, which carries out, inter alia, the end of pipeline depth test on the fragment to determine whether the fragment rendered will actually be seen in the final image using the Z-buffer value 16 for the fragment's position, as is known in the art, and also, e.g., any necessary alpha and/or stencil tests.

The fragments that pass the fragment test stage 14 are then passed to a fragment operation stage 15 which performs any remaining operations necessary on the fragments such as blending with the framebuffer, dither etc.).

Finally, the output fragment, colour, etc., values are written to appropriate colour buffers 17 from where they can, for example, be output to a frame buffer for display. The depth value for a fragment is also written appropriately to the Z-buffer 16, as is known in the art.

The colour buffers 17 and Z-buffer 16 will store, as is known in the art, an appropriate colour, etc., or Z-value, respectively, for each sampling point that the buffers represent (in essence for each sampling point of the tile that is being processed).

FIG. 1 shows an arrangement having four colour buffers 17 and a Z-buffer 16. However, as will be appreciated by those skilled in the art, different combinations and arrangements of output buffers at the end of the rendering pipeline could be used, as desired.

It will be appreciated that each of the stages, elements and units, etc., of the graphics processor as shown in FIG. 1 (and in FIG. 4 discussed below) may be implemented as desired and will accordingly comprise, e.g., appropriate circuitry and/or processing logic, programmable logic, etc., for performing the necessary operation and functions and will form the appropriate control and processing, etc., circuitry for performing the present invention.

The operation of the graphics processing system shown in FIG. 1 in accordance with an embodiment of the present invention will now be described.

As discussed above, the present invention involves sending the primitives to be drawn in response to the commands in a portion of a list of graphics commands through the graphics processing system twice, in a first pass which is intended to determine which primitive will be present at each sample point, and then in the second pass to more fully process the primitive found to be present at each sample point, e.g., and preferably, so as to prepare the data necessary to display the primitives.

Thus, in operation in the manner of the present invention, the command list reader 3 will first read-in and identify a portion of a command list to which operation in the manner of the present invention is to be applied (a suitable mechanism for triggering such operation will be described in more detail below).

In response to identifying such a portion of a command list, the command list reader 3 will send an appropriate command to the render state unit 6 to configure the processor 1 to process the portion of the command list in, in the present embodiment, a Z-only mode of processing. In this Z-only mode of processing, the graphics processing system 1 is configured such that the only written states which are enabled are reads and writes of Z and the Z-test.

The primitives corresponding to the commands in the portion of the command list are then passed as normal through the processing pipeline, but with this special Z-only mode of processing set.

This allows the Z-buffer 16 and the hierarchical Z-pyramid 8 to be filled with the appropriate Z-values for the primitives in the portion of the primitive list, but at the same time the memory accesses and fragment processing and shading, for example, are minimised.

When the end of the portion of the command list to be processed in the manner of the present invention is reached (again a mechanism for indicating this to the command list reader 3 will be described in more detail below), then the command list reader 3 recognises this and triggers processing over the same portion of the command list again (i.e. reads in the portion of the command list from memory a second time), but this time sets, in the present embodiment, the render state for the processing of that portion of the command list (of the primitives corresponding to that portion of the command list) to the normal rendering state indicated by the commands received for the portion of the command list in question. In other words, the command list reader 3 causes the render state unit 6 to configure the graphics processor 1 to process the primitives in the "normal" fashion for the second pass over the portion of the command list.

This means that in the second processing pass, the primitives will be processed as normal, but, for example, when the primitive conservative Z-test 7 and the fragment early Z-test 10 are carried out, those tests will use the Z-values and data already stored in the Z-buffer 16 and the Z-pyramid 8 from the first processing pass. This should result in those tests culling from the processing all except the actual primitive (and fragment) that is to be processed for the sampling point in question (and using only the normal, Z-test, etc., hardware of the graphics processing system).

In other words, the filled Z-buffer 16 from the first processing pass together with the Z-tests performed in the second processing pass, allow the system to determine which primitive should be processed for each sampling point in the second processing pass.

This allows the system to avoid in the second pass the unnecessary processing, such as fragment shading, of any primitives that in fact will be occluded by other primitives to be drawn in response to commands in the portion of the command list that is being processed in this manner, thereby making the second processing pass over the portion of the command list more efficient.

Figure 2:
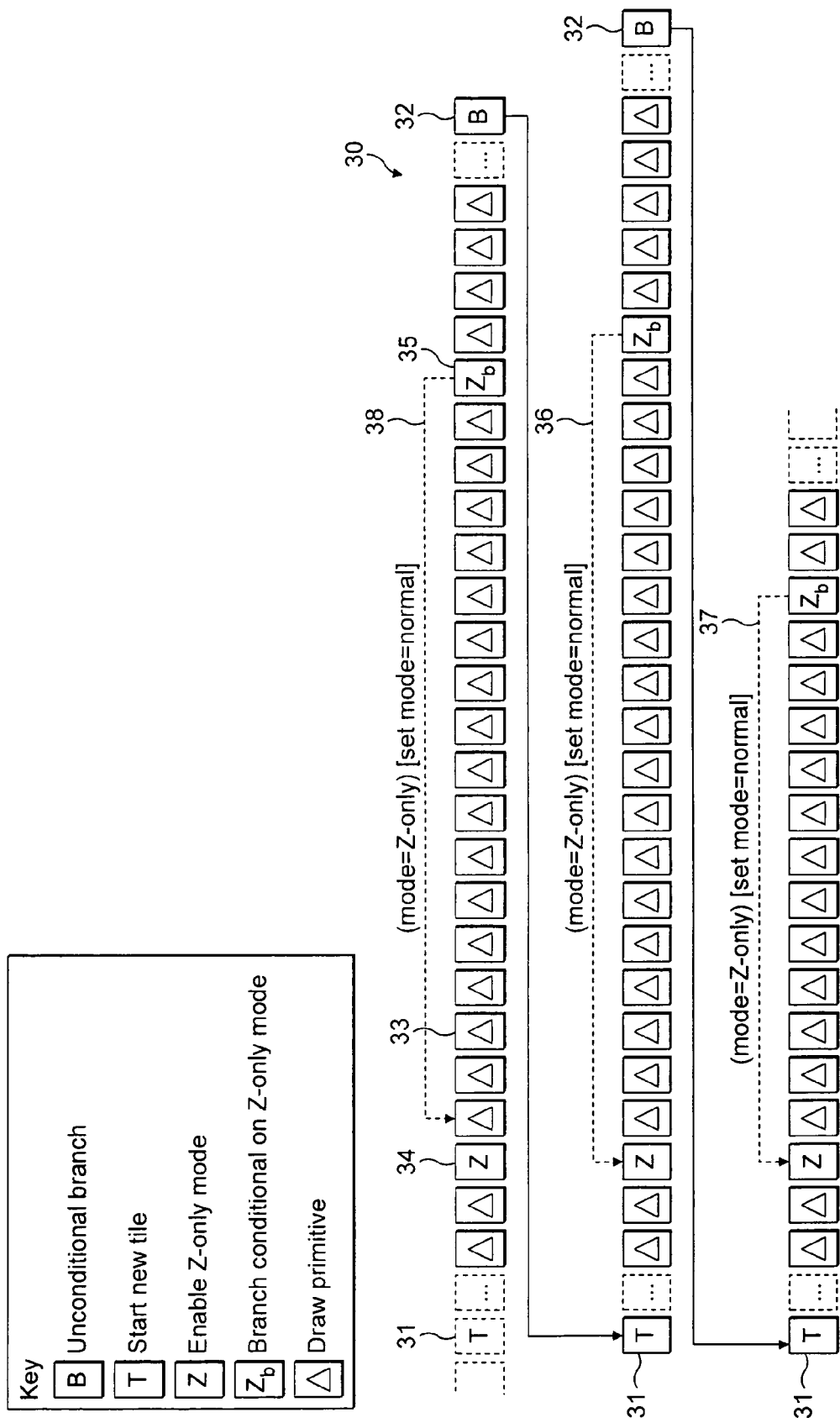
FIG. 2 shows schematically a first embodiment of a command list that may be processed in the manner of the present invention.
Figure 3:
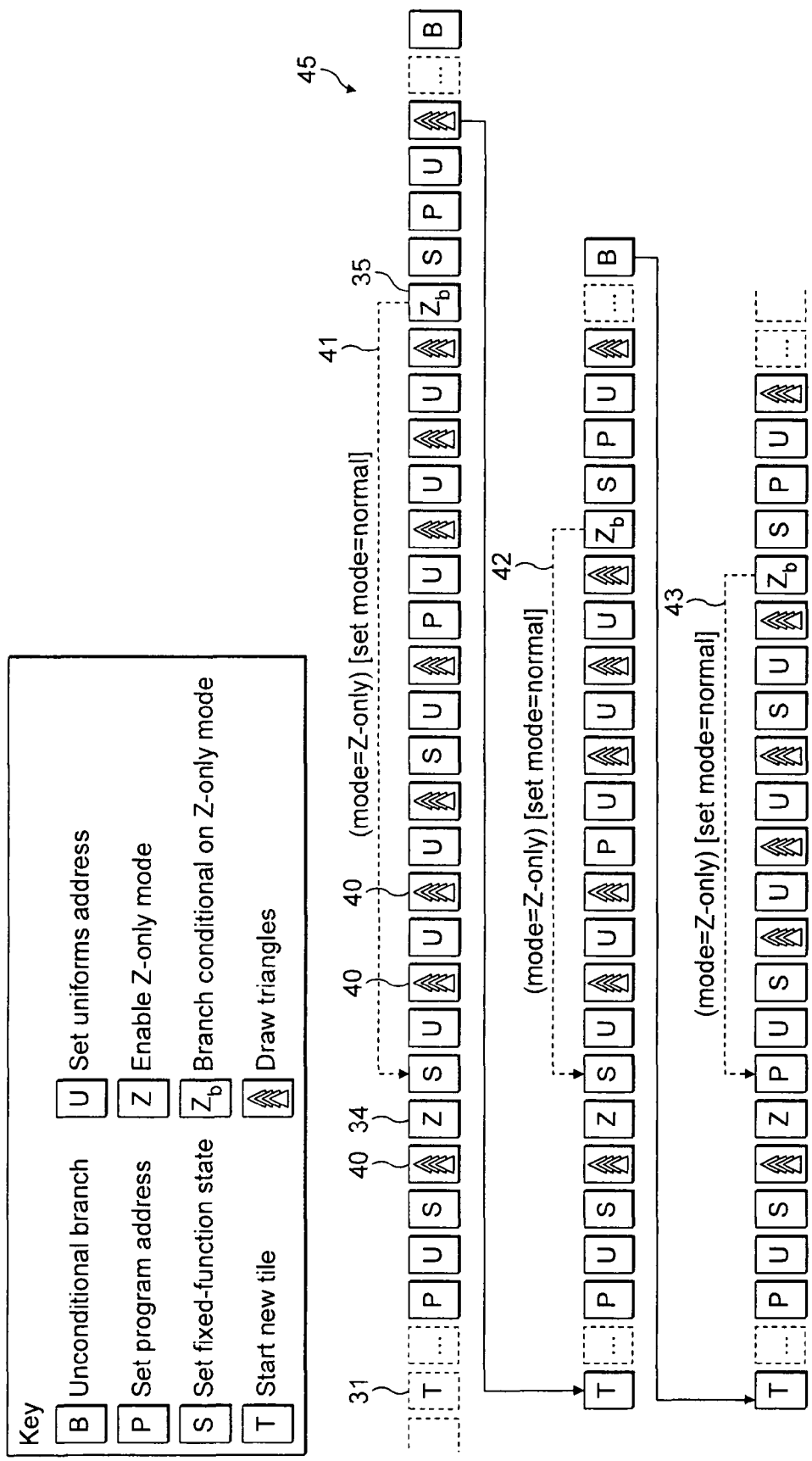
FIG. 3 shows schematically a second embodiment of a command list for triggering operation in the manner of the present invention.

FIGS. 2 and 3 show schematically arrangements for triggering the operation in the manner of the present invention in the present embodiment.

FIG. 2 shows a preferred embodiment for doing this in the case where command list stream in memory includes commands for drawing single primitives. FIG. 3 shows the situation where the command stream includes commands for drawing plural primitives which require primitive data from memory.

Both the lists shown in FIGS. 2 and 3 relate to tile-based rendering systems, and therefore include, inter alia, start new tile commands "IT" and unconditional branch commands "B" which branch the processing to a new tile, as shown in FIGS. 2 and 3. However, if one were to ignore the tile-related commands shown in FIG. 3, then that command list stream would also correspond to the command list input to an immediate mode, non-tiled graphics processing unit as well.

The arrangement shown in FIG. 2 will be described first.

As shown in FIG. 2, the command list 30 includes, as discussed above, start new tile commands 31 and unconditional branch commands 32 (to trigger the start of a new tile), as is known in the art. The combined command list 30 also includes runs of commands 33 instructing primitives to be drawn. In this embodiment, the "draw primitive" commands 33 also contain all the data needed to draw the primitives. These commands will be generated by the driver for the graphics processor and stored in memory so that they can accessed by the command list reader 3 of the graphics processor.

FIG. 2 also shows two new commands that are inserted in the command list, namely an "Enable Z-Only Mode" command "Z" 34 and a "Branch Conditional on Z-Only Mode" command "$Z_b$", 35. These new commands are inserted by the driver around the portions of the command list that it is desired to process in the manner of the present invention, and operate, as will be discussed further below, to trigger operation in the manner of the present invention.

In the present embodiment, the operation in the manner of the present invention is carried out over sequences of commands to draw opaque primitives (i.e. primitives that do not have the potential to show something through them (to show something that is behind them)) with shaders which do not modify their Z-values, and accordingly the driver recognises these sequences and then inserts an Enable Z-only Mode command 34 at the front of such a sequence of commands (primitives), and the Branch Conditional on Z-only Mode command 35 at the end of such a sequence (the sequences 38, 37, 36), as shown in FIG. 2.

Then, when the command list reader 3 recognises an Enable Z-only Mode command 34 in the primitive list, it triggers the switching of the graphics processor 1 into the "Z-only" processing mode in which the only render states enabled are reads and writes of Z and the Z-test, as discussed above. The sequence of commands, such as the sequence 38 shown in FIG. 2, is then processed in this mode until the command list reader identifies the Branch Conditional on Z-only Mode command 35 at the end of the sequence.

The Branch Conditional on Z-only Mode command encodes a conditional branch, in which the branch condition is whether the current rendering mode is "normal" or "Z-only". It also triggers as a side effect of taking the branch a transition from Z-only mode to normal rendering mode.

The effect of this is that at the end of the first processing pass of the relevant portion of the command list (e.g. the portion 38 in FIG. 2), the command list reader will trigger the conditional branch indicated by the Branch Conditional on Z-only Mode command 35 (as at that point the graphics processor 1 will be in Z-only mode as triggered by the Enable Z-only Mode command 34), so as to branch back to the head of the portion 38 of the command list, but also switching the graphics processing to normal rendering mode.

The portion 38 of the command list denoted by these commands will then be traversed, as discussed above, a second time by the graphics processor 1, but this time the primitives to be drawn can be early Z-culled as discussed above, so that only the, e.g., nearest surfaces should generate sampling points and fragments for shading.

Then when the Branch Conditional on Z-only Mode command 35 is reached a second time during this second pass, the branch command will not be triggered because the processor will then be processing in normal mode (i.e. the graphics processing will not be in Z-only mode), so the branch will not be taken and the processing of the remainder of the command list in the normal fashion can proceed.

FIG. 3 shows a slightly different command list arrangement. FIG. 3 shows a command list 45 again including, inter alia, "new tile" commands 31, and "Draw Triangle" commands 40. However, in this case the draw triangle commands 40 do not themselves include all the necessary primitive data, and so instead trigger the reading of the appropriate primitive (triangle) data from a primitive list (or lists) corresponding to the triangles that the command 40 indicates should be drawn.

As shown in FIG. 3, again the appropriate Enable Z-Only Mode commands 34 and Branch Conditional on Z-Only Mode commands 35 are inserted in the command list around sequences of Draw Triangle (primitives) commands 40 to which the present invention is to be applied, such as the sequences 41, 42 and 43 shown in FIG. 3.

These commands then trigger operation in the manner discussed above in relation to FIG. 2.

It will be appreciated from the above, that in both the FIG. 2 and FIG. 3 arrangements, the effect is that a sequence of (opaque) primitives is processed in the manner of the present invention, since the sequence of commands 41, for example, shown in FIG. 3, effectively denotes a corresponding sequence of primitives that corresponds to the primitives to be drawn in response to the Draw Triangle commands 40 encompassed in the sequence 41.

Although FIGS. 2 and 3 illustrate triggering the operation of the present invention by including appropriate commands in the command list provided to the graphics processor, this operation could be triggered in other ways, if desired. For example, the graphics processor could itself identify commands that will draw runs of opaque primitives, for example, and then trigger operation in the manner of the present invention for such runs (and, for example, store data, such as address data, that is necessary to allow the two processing passes through such runs).

The graphics processor 1 can be configured to the appropriate Z-only mode and normal mode for the above operation in response to the commands included in the command list in any appropriate and desired manner. For example, there could be a global render state change triggered to set the processing pipeline to Z-only mode or normal rendering mode, as appropriate.

Where, as in, for example, a system as described in the Applicant's earlier UK Patent Application No. GB-A-2420261, primitives and fragments, etc., carry an index to one of a number of predefined rendering states in an internal field, then preferably one of those predefined rendering states is set to the Z-only mode render state. In this case, when the Z-only mode is triggered, then the render state index of each primitive could be rewritten to the particular Z-only mode predefined render state (e.g. render state index 0, for example), before passing it through the graphics processor towards the rasteriser. The primitives would accordingly automatically pick up the Z-only render state for the Z-only mode pass through the processor.

It would also be possible, and is preferred, to similarly reserve a fragment program address (where fragment shading is used) for the Z-only mode render state. This address would then preferably trigger bypassing of the fragment shader (since a fragment program would not normally be needed for the Z-only mode render state).

In the present embodiment, if the second processing pass through the sequence of primitives is to be carried out using a Z-compare function of <= (less than or equal to) or of >= (greater than or equal to), then that Z-compare function is used in the second processing pass.

However, if the indicated Z-compare function for the primitives in question is < (less than) or > (greater than), then that indicated (by the original graphics drawing instructions) Z-compare function is changed in the second processing pass to a Z-compare function of <= (less than or equal to) or >= (greater than or equal to), respectively.

This is so as to ensure that the desired primitive (fragment) will still pass the Z-compare test in the second processing pass, given that the Z-buffer 16 and Z-pyramid 8 will already contain the depth value of that primitive (fragment) for the sampling point in question. This should ensure that the same primitive (fragment) as would be drawn without the present invention is always generated, and the result of a tie in the Z-test is not affected for the second processing pass.

In the present embodiment this change to the Z-compare function for the second processing pass, where necessary, is performed in the driver support software. It would be possible, for example, to provide this as a compilation option for the drivers to thereby allow a platform integrator to decide whether to make this modification or not.

It would also, for example, be possible to forbid operation in the manner of the present invention in cases where the depth test specified for the portion of the primitive list is < or > (less than or greater than) (i.e. to only enable the invention for runs of primitives for which the depth test is specified as <= or >= (less than or equal to, or greater than or equal to) in any event). This would then avoid any need for a change in the Z-compare function of the depth test when implementing the present invention.

Both of the above changes can be effected with only a software change in the drivers, and so they would allow the present invention to be, for example, used in an existing design with minimal and only local changes to it.

In an alternative arrangement, to also ensure that the correct primitive and fragment passes the Z-test in the second processing pass, instead of changing the Z-compare function as necessary as discussed above, it would be possible to offset the Z-values written in the first processing pass, either away from the viewpoint for the < (less than) family of Z-comparisons or toward it for the > (greater than) family of Z-comparisons, so as to again ensure that the correct fragments (primitives) are shaded in the second processing pass.

Figure 5:
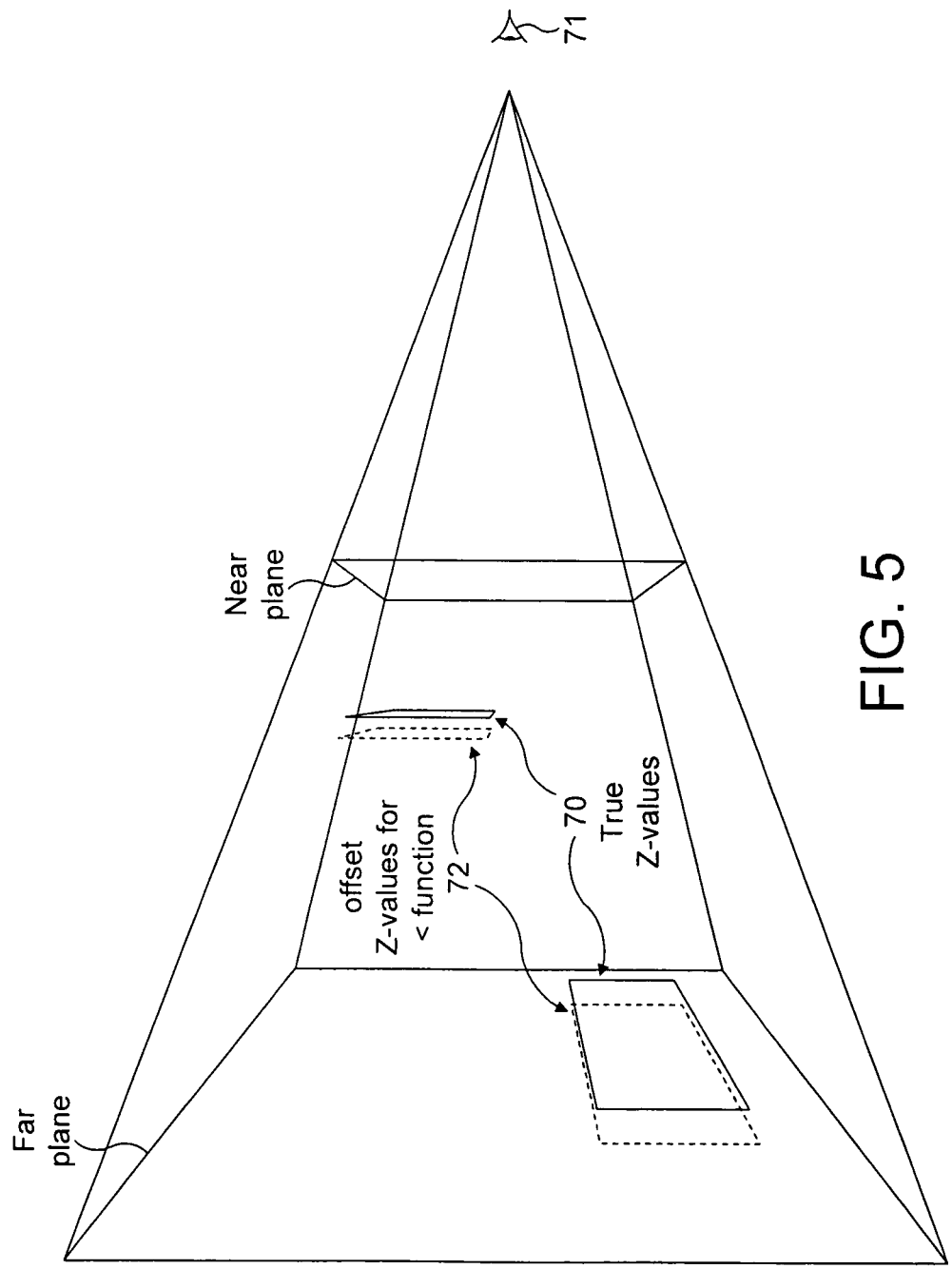
FIG. 5 shows schematically the offsetting of Z values in accordance with an embodiment of the present invention.

FIG. 5 illustrates this, and shows the offsetting of the Z-values 70 determined in the first processing pass away from the viewpoint 71 to give a set of offset Z-values 72 for when a Z-compare function of < (less than) is to be used.

In this arrangement, the Z-values 70 determined in the first processing pass are offset with the smallest amount possible which can be added to (or subtracted from, as appropriate) the determined Z-value from the first processing pass with any effect.

Thus in the case of an integer Z-buffer, the Z-value written in the first processing pass is incremented or decremented by one, as appropriate.

In the case of floating point Z-values, the smallest offset to be applied will vary depending upon the Z-value itself, but the smallest number that can be added to or subtracted from the current Z-value can in that case readily be determined from the Z-value's exponent and the constant size of it mantissa.

The determined offset is then applied to the determined Z-value in the first processing pass before writing the Z-value to the Z-buffer 16 (and thus also to the Z-pyramid 8).

In an alternative arrangement to either offsetting the Z-values or changing the Z-compare function as discussed above, it would be possible to augment the Z-buffer with a primitive ID buffer in which, in the first processing pass, the identity of the primitive that is determined to apply to each sampling point is stored. Then, in the second processing pass instead of using the Z-buffer for the per-fragment test, each fragment would have its ID compared to the primitive ID previously stored in the primitive ID buffer for that fragment (for the sampling point or points to which the fragment corresponds), and only those fragments that match the ID stored in the primitive ID buffer shaded and written out in the second processing pass.

In other words, in the second processing pass, the per fragment (per sampling point) early depth test would be replaced by an identity comparison between a primitive identity associated with a fragment and a primitive identity stored in a primitive ID buffer that has been generated in the first processing pass.

In this arrangement, the primitive identities could, for example, be allocated by using a counter which is incremented for each primitive that is input, the primitives being allocated an ID from this counter as they flow into the rendering pipeline. Then, for the second processing pass, the primitive counter can be reset so that the primitives again acquire the appropriate identity as they flow into the pipeline.

Figure 4:
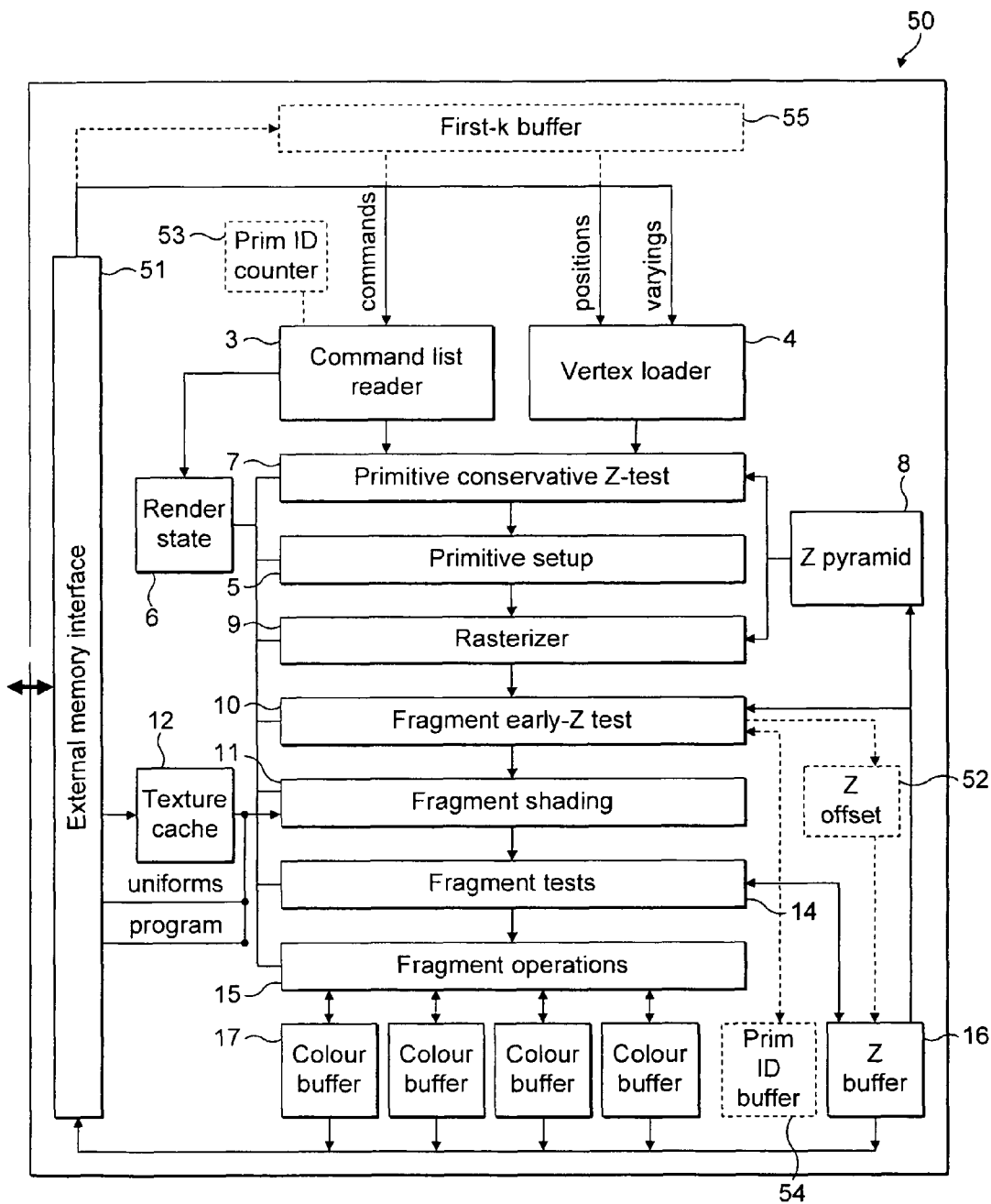
FIG. 4 shows schematically a second embodiment of a graphics processor system in which the present invention can be implemented.

FIG. 4 shows a second embodiment of a graphics processing system that shows schematically some of the above alternative arrangements.

As shown in FIG. 4, the graphics processing system 50 of this embodiment includes a number of like components with the embodiment shown in FIG. 1. However, it also has some additions to that embodiment that may be used to incorporate the above alternative arrangements.

FIG. 4 also shows schematically an external memory interface 51 which is used by the graphics processing system, such as the command list reader 3 and vertex data 4, to access the relevant data, such as command lists and vertex data, from external memory.

FIG. 4 firstly shows schematically a Z-offset stage 52 which can be used, as discussed above, to apply an appropriate offset to Z-values determined in the first, Z-only mode, processing pass before they are written to the Z-buffer 16, as discussed above.

FIG. 4 also shows schematically a primitive ID counter 53 and a primitive ID buffer 54 which may be used, as discussed above, to identify the appropriate primitive to be processed in the second processing pass.

As discussed above, in this arrangement, the primitive ID counter 53, which in the present embodiment is a 16-bit counter, is reset when a portion of a command list is to be processed in the manner of the present invention, and then incremented for each primitive of the sequence denoted by the portion of the command list that is input. The primitives then obtain an appropriate ID from the counter as they flow on to the rendering pipeline.

In the first processing pass, the primitive identity (counter value) allocated to a given fragment for a given sampling point is written to the primitive ID buffer 54 as its depth value is written to the corresponding Z-buffer element in the Z-buffer 16. In the present embodiment the primitive ID buffer 54 is a 16-bit per sampling point buffer, although other arrangements could, of course, be used.

Then, in the second processing pass over the portion of the command list (i.e. the full render-state pass), the primitive counter 53 is first reset so that the primitives corresponding to the portion of the command list will acquire the same ID from the counter as in the first processing pass as they flow on to the rendering pipeline.

However, in this second processing pass, the Z-buffer 16 is not employed for the per sample point test (although the Z-pyramid 8 could still be employed conservatively). Instead, each fragment has its allocated primitive ID compared to the corresponding primitive ID for that sample position or positions stored in the primitive ID buffer 54, with those fragments that do not match being culled and those that do match being shaded and written out to the colour buffers, etc.

FIG. 4 also shows schematically an on-chip buffer 55 which can be used to store data retrieved from external memory on the graphics processing platform 50 itself. This buffer can be used, inter alia, to avoid or reduce the need to read the primitive list and vertex positions, for example, from external memory twice when implementing the present invention.

To use this buffer, when the command list and vertex data, etc., are read from external memory during the first Z-only processing pass in the present embodiment, that data is stored in the buffer 55 so that it is available in that buffer for the second processing pass through that portion of the primitive list.

The buffer 55 is preferably reset by the Z-only command (i.e. such that it can then be filled with new data for the portion of the command list to which the new Z-only command relates).

The buffer 55 shown in FIG. 4 is shown as having a size of length K, i.e. the ability to store data for a run (sequence) of up to K primitives. This buffer may be used, for example, in one of the following ways.

Firstly, as the buffer 55 is of fixed length K, if a portion of a command list to be processed in the manner of the present invention is longer than the length K of the buffer 55, then the command list could be divided into sub-lengths that will each fit into the buffer 55, so that each such sub-length of the overall portion of the command list would, in effect, have its own Z-only first processing pass arrangement.

Alternatively, the buffer 55 could, for example, be filled with the first K command list entries and associated vertex positions of a given portion of a command list to be processed in the manner of the present embodiment. In this case, for the second processing pass over that portion of the command list, the first K commands, etc., would be retrieved from the buffer 55, but any remaining commands, etc., would be retrieved from external memory again.

It would also be possible, for example, to define some multiple of the length K of the buffer 55 above which a portion of the command list would be broken into sub-portions, each then having their own processing in the manner of the present invention.

Although the above embodiments have been described in the context of an arrangement in which a command list is read and executed twice by the graphics processor, it would be possible to have arrangements in which that was not necessary, although that would require storing of more data on-chip following the first processing pass.

For example, in the first processing pass, it would be possible to run the interpolation operation including texture and any other varyings for the primitives in question, but without sampling textures, and then buffer sufficient information per sampling point to allow the second processing pass to take place without the need to re-parse the command list. Once the primitives (fragments) to be processed are determined, they can then be processed in the second pass using the buffered information.

This arrangement would avoid the need to read-in the commands, etc., a second time, but would require larger internal buffers and more processing steps in the first processing pass.

A further alternative would be to store for each sampling point the primitive command which wrote to that sampling point as determined in the first processing pass. The second processing pass with full render states would then again not need to read-in the command list, but could instead run over the sampling points in the buffers, using the stored primitive command to determine exactly which state to set-up for processing the sampling point in the second processing pass.

In this arrangement, a 64-bit primitive command tile buffer would preferably be used.

It can be seen from the above that the present invention, in its preferred embodiments at least, provides an improved technique for avoiding the rendering of non-visible fragments.

The present invention can accordingly provide, in its preferred embodiments at least, a reduction in the use of external memory bandwidth, and accordingly a reduction in power usage. It can also facilitate an increase in the speed of rendering and in the ability to deal with complex scenes, and can do so in a manner which is transparent to an application.

This is achieved in the preferred embodiments of the present invention at least, by configuring the graphics processing system to process the primitives to be drawn in response to commands in a portion of a command list twice, once in a Z-only rendering mode, and then again with full rendering states enabled, but using the Z-values determined from the first processing pass to cull primitives and fragments from processing in the second processing pass. In a preferred embodiment commands are inserted in a command list at the head and tail of runs of commands for drawing runs of opaque primitives so as to trigger this operation.

The invention claimed is:

1. A method of operating a graphics processor in which lists of graphics commands to be executed by the graphics processor are prepared and stored in memory prior to the commands being executed by the graphics processor, said lists include commands instructing the graphics processor to draw primitives, the method comprising:

performing a first processing pass over a sequence of commands in a portion of one of said lists, wherein there are primitives to be drawn in response to the commands in the sequence, said first processing pass deriving data that can aid the selection of at least one primitive from said primitives to be drawn for processing in respect of each sampling point of a set of sampling points;

storing the derived data; and performing a second processing pass over the sequence of commands to process the primitives to be drawn using the stored data to help select at least one primitive from said primitives to be drawn to be processed for each sampling point in the second processing pass, wherein a conditional branch command is included at the end of the sequence of commands for triggering the second processing pass after the first processing pass by causing the graphics processor to return to the beginning of the sequence of commands and re-execute the sequence of commands, and by triggering a change in state of the graphics processing system when the branch is taken, wherein the condition for taking the branch is the current state of the graphics processing system.

2. The method of claim 1, wherein the first processing pass comprises performing depth-tests at each sampling point so as to determine the visible primitive from said primitives to be drawn at each sampling point based on the primitives' depth values.

3. The method of claim 1, wherein the first processing pass comprises performing a depth-only rendering pass over the primitives to be drawn.

4. The method of claim 1, wherein the derived data comprises a depth buffer derived from the first processing pass.

5. The method of claim 1, wherein the derived data comprises, for each sampling point, an identifier that can be used to identify the primitive from said primitives to be drawn to be processed at the sampling point during the second processing pass.

6. The method of claim 1, wherein the second processing pass comprises a rendering pass to provide the data necessary to display the primitives to be drawn on a display.

7. The method of claim 1, wherein the second processing pass uses stored primitive identifiers from the first processing pass to determine the at least one primitive to be processed for each sampling point in the second processing pass, or the second processing pass uses stored depth buffer values from the first processing pass to determine the at least one primitive to be processed for each sampling point in the second processing pass.

8. The method of claim 1, comprising storing some or all of the read data from said portion of one of said lists for the first processing pass on the graphics processor itself, so that it is then available in memory on the graphics processor for the second processing pass.

9. A graphics processing system comprising:

memory configured to store lists of graphics commands to be executed by a graphics processor prior to the commands being executed by the graphics processor, said lists include commands instructing the graphics processor to draw primitives;

a graphics processor comprising processing circuitry configurable to perform processing passes over a sequence of commands in a portion of one of said lists, wherein there are primitives to be drawn in response to the commands in the sequence;

control circuitry configured to cause the processing circuitry to perform a first processing pass over said sequence of commands to derive data that can aid the selection of the of at least one primitive from said primitives to be drawn for processing in respect of each sampling point of a set of sampling points;

memory configured to store the derived data; and the control circuitry further being configured to cause the processing circuitry to perform a second processing pass over the sequence of commands, to process the primitives to be drawn using the stored data to help select at least one primitive from said primitives to be drawn to be processed for each sampling point in the second processing pass, wherein a conditional branch command is included at the end of the sequence of commands for triggering the second processing pass after the first processing pass by causing the graphics processor to return to the beginning of the sequence of commands and re-execute the sequence of commands, and by triggering a change in state of the graphics processing system when the branch is taken, wherein the condition for taking the branch is the current state of the graphics processing system.

10. The system of claim 9, wherein the control circuitry is configured to cause the processing circuitry when performing the first processing pass, to perform depth-tests at each sampling point so as to determine the visible primitive from said primitives to be drawn at each sampling point based on the primitives' depth values.

11. The system of claim 9, wherein the control circuitry is configured to cause the processing circuitry when performing the first processing pass to perform a depth-only rendering pass over the primitives to be drawn.

12. The system of claim 9, wherein the derived data comprises a depth buffer derived from the first processing pass.

13. The system of claim 9, wherein the derived data comprises, for each sampling point, an identifier that can be used to identify the primitive from said primitives to be drawn to be processed at the sampling point during the second processing pass.

14. The system of claim 9, wherein the control circuitry is configured to cause the processing circuitry when performing the second processing pass to perform a rendering pass to provide the data necessary to display the primitives to be drawn on a display.

15. The system of claim 9, wherein the control circuitry is configured to cause the processing circuitry when performing the second processing pass to use stored primitive identifiers from the first processing pass to determine the at least one primitive to be processed for each sampling point in the second processing pass.

16. The system of claim 9, wherein the control circuitry is configured to cause the processing circuitry when performing the second processing pass to use stored depth buffer values from the first processing pass to determine the at least one primitive to be processed for each sampling point in the second processing pass.

17. The system of claim 9, comprising a memory configured to store some or all of the read data from said portion of one of said lists for the first processing pass on the graphics processor itself, so that it is then available in memory on the graphics processor for the second processing pass.

18. A computer program product comprising computer software code stored on a non-transitory computer readable medium for performing a method when the software code is run on a data processor of a graphics processor in which lists of graphics commands to be executed by the graphics processor are prepared and stored in memory prior to the commands being executed by the graphics processor, said lists include commands instructing the graphics processor to draw primitives, said method comprising:

performing a first processing pass over a sequence of commands in a portion of one of said lists wherein there are primitives to be drawn in response to commands in the sequence, the first processing pass deriving data that can aid the selection of at least one primitive from said primitives to be drawn for processing in respect of each sampling point of a set of sampling points;

storing the derived data; and performing a second processing pass over the sequence of commands, to process the primitives to be drawn using the stored data to help select at least one primitive from said primitives to be drawn to be processed for each sampling point in the second processing pass, wherein a conditional branch command is included at the end of the sequence of commands for triggering the second processing pass after the first processing pass by causing the graphics processor to return to the beginning of the sequence of commands and re-execute the sequence of commands, and by triggering a change in the state of the graphics processing system when the branch is taken, wherein the condition for taking the branch is the current state of the graphics processing system.

* * * * *